United States Patent
Sahlin et al.

(10) Patent No.: US 10,374,857 B2
(45) Date of Patent: Aug. 6, 2019

(54) TRANSMITTING AND RECEIVING REFERENCE SIGNALS

(71) Applicant: TELEFONAKTIEBOLAGET L M ERICSSON (PUBL), Stockholm (SE)

(72) Inventors: Henrik Sahlin, Mölnlycke (SE); Jianfeng Wang, Beijing (CN); Icaro L. J. da Silva, Bromma (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 340 days.

(21) Appl. No.: 14/889,779

(22) PCT Filed: Oct. 30, 2015

(86) PCT No.: PCT/EP2015/075304
§ 371 (c)(1),
(2) Date: Nov. 6, 2015

(65) Prior Publication Data
US 2017/0257243 A1 Sep. 7, 2017

(51) Int. Cl.
*H04L 27/26* (2006.01)
*H04L 5/00* (2006.01)

(52) U.S. Cl.
CPC ........ *H04L 27/2613* (2013.01); *H04L 5/0048* (2013.01); *H04L 27/2607* (2013.01)

(58) Field of Classification Search
None
See application file for complete search history.

(56) References Cited

U.S. PATENT DOCUMENTS

| | | | | |
|---|---|---|---|---|
| 2007/0140106 A1* | 6/2007 | Tsai | ...... | H04B 7/2681 370/208 |
| 2010/0008282 A1 | 1/2010 | Bhattad | | |
| 2014/0273869 A1* | 9/2014 | Zhao | ...... | H04W 24/08 455/67.11 |
| 2015/0016339 A1* | 1/2015 | You | ...... | H04J 11/0073 370/328 |
| 2015/0358129 A1* | 12/2015 | Ryu | ...... | H04L 5/0023 455/438 |

FOREIGN PATENT DOCUMENTS

| | | |
|---|---|---|
| WO | 2007117127 A1 | 10/2007 |
| WO | 2008044882 A1 | 4/2008 |
| WO | 2008072899 A2 | 6/2008 |

OTHER PUBLICATIONS

Minn, et al. On timing offset estimation for OFDM systems. IEEE Communications Letters, IEEE Service Enter, Piscataway, NJ, US, vol. 4, No. 7, Jul. 1, 2000 (Jul. 1, 2000).

(Continued)

*Primary Examiner* — Kent K Krueger

(57) ABSTRACT

There is provided mechanisms for transmitting reference signals. A method is performed by a first network device. The method comprises transmitting, in a single orthogonal frequency-division multiplexing (OFDM) symbol, a composite reference signal to a second network device. The composite reference signal is a time domain concatenation of at least a first reference signal and a last reference signal. The composite reference signal has a single cyclic prefix. The cyclic prefix is determined according to a last part of the single OFDM symbol. There is also provided mechanisms for receiving such reference signals.

20 Claims, 6 Drawing Sheets

(56) References Cited

OTHER PUBLICATIONS

3rd Generation Partnership Project; Technical Specification Group Radio Access Network; Evolved Universal Terrestrial Radio Access (E-UTRA); Physical channels and modulation (Release 12) 3GPP TS 36.211 V12.5.0 (Mar. 2015).
3rd Generation Partnership Project; Technical Specification Group Radio Access Network; Evolved Universal Terrestrial Radio Access (E-UTRA); Physical layer procedures (Release 12) 3GPP TS 36.213 V12.5.0 (Mar. 2015).

\* cited by examiner

TRANSMITTING AND RECEIVING REFERENCE SIGNALS

TECHNICAL FIELD

Embodiments presented herein relate to a method, a network device, a computer program, and a computer program product for transmitting reference signals. Embodiments presented herein further relate to a method, a network device, a computer program, and a computer program product for receiving reference signals.

BACKGROUND

In communications networks, there may be a challenge to obtain good performance and capacity for a given communications protocol, its parameters and the physical environment in which the communications network is deployed.

For example, one parameter in providing good performance and capacity for a given communications protocol in a communications network is synchronization.

For example, when a wireless device, such as a user equipment (UE) is powered on, or when it moves between cells in a cellular wireless radio access network, it receives and synchronizes to downlink signals (as transmitted by radio access network nodes of the cellular wireless radio access network) in a cell search procedure. One purpose of this cell search procedure is to identify the best cell for the wireless device and to achieve time and frequency synchronization to the network in the downlink (i.e. from radio access network node to wireless device).

So-called Primary and Secondary Synchronization Signals (PSS and SSS) as defined in Section 6.11 of 3GPP TS 36.211, version 12.5.0, can, for Long Term Evolution (LTE), be used at cell search as performed by the wireless device, see section 4.1 in 3GPP TS 36.213, V 12.5.0. Here, in the case of frequency-division duplexing (FDD), the PSS is transmitted in the last orthogonal frequency-division multiplexing (OFDM) symbol of slots 0 and 10 within a frame and the SSS is transmitted in the OFDM symbol preceding the PSS. In the case of time-division duplexing (TDD), the PSS is transmitted in the third OFDM symbol of slots 3 and 13 within a frame, and the SSS is transmitted in the last OFDM symbol of slots 2 and 12, i.e., three symbols ahead of the PSS.

A simplified initial cell search procedure between a second network device 300 of a wireless device 130 and a first network device 200 of a radio access network node 120 is illustrated in the signalling diagram of FIG. 9.

S901: The wireless device 130 is powered "on".

S902: The radio access network node 120 transmits PSS.

S903: The wireless device 130 receives the PSS and determines therefrom a physical layer ID within a group (1 out of 3 groups), OFDM symbol synchronization, and coarse frequency offset estimation. Here the wireless device tries to detect PSS from which the wireless device can derive the cell identity (ID) within a cell-identity group, which consists of three different cell identities corresponding to three different PSS. In this detection, the wireless device thus has to blindly search for all of these three possible cell identities. The wireless device also achieves OFDM symbol synchronization and a coarse frequency offset estimation with an accuracy of about 1 kHz. The latter is estimated by the wireless device by evaluating several hypotheses of the frequency error.

S904: The radio access network node 120 transmits SSS.

S905: The wireless device 130 receives the SSS and determines therefrom a physical cell ID, radio frame synchronization, cyclic prefix length, duplex mode (and, optionally, fine frequency offset estimation). The wireless device uses coherent detection of the SSS thanks to the PSS decoding from which the wireless device acquires the physical cell ID and achieves radio frame synchronization. Here, the wireless device also detects if normal or extended cyclic prefix is used. If the wireless device is not preconfigured for TDD or FDD, the wireless device can detect the duplex mode (TDD or FDD) by the position in the frame of detected SSS in relation to detected PSS. Fine frequency offset estimation can be estimated by correlating PSS and SSS.

S906: The radio access network node 120 transmits cell specific reference signals (CRS).

S907: The wireless device 130 receives the CRS and determines therefrom channel estimation (and, optionally, fine frequency offset estimation). The fine frequency offset estimation can thus alternatively be estimated by the wireless device using the Cell specific Reference Signals (CRS) which are derived from the Physical Cell Identity (PCI) encoded in the PSS/SSS.

S908: The radio access network node 120 transmits a physical broadcast channel (PBCH).

S909: The wireless device 130 receives the PBCH and decodes therefrom a master information block (MIB). Once the wireless device is capable of processing the CRSs the wireless device can thus receive and decode cell system information which contains cell configuration parameters starting with the PBCH.

The PSS and the SSS are examples of reference signals. Two examples of how such reference signals can be transmitted will be disclosed below with reference to FIGS. 10 and 11.

The radio access network within LTE is based on transmission of OFDM symbols in downlink and Discrete Fourier Transform (DFT) spread OFDM (also known as single carrier frequency division multiple access, SC-FDMA) in the uplink. In DFT-spread OFDM the signal to be transmitted in the uplink is pre-coded by a DFT, mapped to a frequency interval in which it is allocated, transformed to the time domain, concatenated with a cyclic prefix and then transmitted over the radio interface. The DFT spread OFDM scheme as used in uplink has significantly lower Peak to Average Power Ratio (PAPR) as compared to OFDM. By having a low PAPR, the transmitter can be equipped with simpler and less energy consuming radio equipment, which is beneficial for wireless devices where cost and battery consumptions are can be issues.

FIG. 10 is a schematic illustration of reference signal allocation of two related synchronization signals 1A and 1B in a time frequency grid according to a first example. Two OFDM symbols are shown along the time axis and N1+1, where N1 is an integer, number of sub-carriers are shown along the frequency axis. Synchronization signal 1A is a first synchronization signal and synchronization signal 1B is a second synchronization signal. This first synchronization signal 1A can, for example, be a PSS and the second synchronization signal 2B could be a SSS. If beamforming is used, both synchronization signals 1A and 1B are transmitted with one configuration of the beamforming. Similar to the FDD mode in LTE release 8, the synchronization signals 1A and 1B are transmitted in adjacent OFDM symbols number 0 and 1.

Another beamforming configuration can be used to transmit the synchronization signals in OFDM symbols 2, 4, . . . . As described earlier, the LTE release 8 synchronization procedures starts with OFDM symbol synchronization by PSS detection. In order to keep low computational complexity, the same synchronization signal is used for both OFDM symbol 0 and 2 but with different beamforming configurations. The wireless device can then detect either the synchronization signal in OFDM symbol 0 or 2, from the best detection of the sequence used in both OFDM symbol 0 or 2.

The wireless device can then continue to detect the second synchronization signal 1B in OFDM symbols 1, 3, . . . , which can be different sequences. Here, the wireless device can detect the second synchronization signal 1B in OFDM symbol 2 or 3 after having detected the first synchronization signal 1A. After detecting the second synchronization signal 1B, the wireless device knows the symbol index, if different second synchronization signals 1B are used in different OFDM symbols. The symbol index is thus implicitly signaled by the second synchronization signal 1B.

This approach can be extended to any number of first synchronization signals, as transmitted in OFDM symbols 0, 2, 4, . . . followed by second synchronization signals, as transmitted in OFDM symbols 1, 3, 5, . . . . By placing the first synchronization signal 1A and the second synchronization signal 1B in different OFDM symbols, the same beamforming is always used in two consecutive OFDM symbols.

FIG. 11 is a schematic illustration of reference signal allocation of four related synchronization signals 1A, 1B 2A, 2B in a time frequency grid according to a second example. Two OFDM symbols are shown along the time axis and N2+1, where N2>N1 is an integer, number of sub-carriers are shown along the frequency axis.

According to the reference signal allocation of FIG. 11 a mapping of the first synchronization signal 1A and the second synchronization signal 1B is made to the same OFDM symbol, but using different sub-carriers. Here, half of the number of OFDM symbols can be used as compared to the approach in FIG. 10, but instead twice the number of sub-carriers needs to be allocated. Since the beamforming is performed per OFDM symbol basis, the time required to transmit in a specific number of beamforming candidates is half as compared to the approach in FIG. 10.

At least two OFDM symbols are needed for the first and second synchronization signals for the approach in FIG. 10. In future communications systems with beamforming, the synchronization signals will have to be beamformed with several beamforming candidates which increases the number of symbols needed for synchronizations. For analog beamforming, each OFDM symbol used for synchronization signal with a specific beamforming requires hardware support. Assuming beams transmitted in several directions, longer delays proportional to the number of directions can be reached; i.e., M beam directions, where M>1 is an integer, basically means a delays up to two times M per antenna array for the approach in FIG. 10.

If the reference signal allocation of FIG. 11 is used, the first synchronization signal 1A and the second synchronization signal 1B are mapped to the same OFDM symbol, but different sub-carriers (and likewise for the first synchronization signal 2A and the second synchronization signal 2B). Despite the potential to reduce the delay to acquire synchronization since the first and second synchronization signals are mapped to different sub-carriers, the single carrier property of the transmission is violated, thus resulting in higher PAPR in the transmitter.

Hence, there is still a need for an improved transmission and reception of m reference signals.

SUMMARY

An object of embodiments herein is to provide efficient transmission and reception of reference signals.

According to a first aspect there is presented a method for transmitting reference signals. The method is performed by a first network device. The method comprises transmitting, in a single orthogonal frequency-division multiplexing (OFDM) symbol, a composite reference signal to a second network device. The composite reference signal is a time domain concatenation of at least a first reference signal and a last reference signal. The composite reference signal has a single cyclic prefix. The cyclic prefix is determined according to a last part of the single OFDM symbol.

According to a second aspect there is presented a network device for transmitting reference signals. The network device comprises processing circuitry. The processing circuitry is configured to cause the network device to transmit, in a single OFDM symbol, a composite reference signal to a second network device. The composite reference signal is a time domain concatenation of at least a first reference signal and a last reference signal. The composite reference signal has a single cyclic prefix. The cyclic prefix is determined according to a last part of the single OFDM symbol.

According to a third aspect there is presented a network device for transmitting reference signals. The network device comprises processing circuitry. The network device comprises a computer program product storing instructions that, when executed by the processing circuitry, causes the network device to transmit, in a single OFDM symbol, a composite reference signal to a second network device. The composite reference signal is a time domain concatenation of at least a first reference signal and a last reference signal. The composite reference signal has a single cyclic prefix. The cyclic prefix is determined according to a last part of the single OFDM symbol.

According to a fourth aspect there is presented a network device for transmitting reference signals. The network device comprises a transmit module configured to transmit, in a single OFDM symbol, a composite reference signal to a second network device. The composite reference signal is a time domain concatenation of at least a first reference signal and a last reference signal. The composite reference signal has a single cyclic prefix. The cyclic prefix is determined according to a last part of the single OFDM symbol.

According to a fifth aspect there is presented a computer program for transmitting reference signals, the computer program comprising computer program code which, when run on processing circuitry of a network device, causes the processing circuitry to perform a method according to the first aspect.

According to a sixth aspect there is presented a method for receiving reference signals, the method being performed by a second network device. The method comprises receiving, in a single OFDM symbol, a composite reference signal from a first network device. The composite reference signal is a time domain concatenation of at least a first reference signal and a last reference signal. The composite reference signal has a single cyclic prefix. The cyclic prefix is determined according to a last part of the single OFDM symbol.

According to a seventh aspect there is presented a network device for receiving reference signals. The network device comprises processing circuitry. The processing circuitry is configured to cause the network device to receive, in a single OFDM symbol, a composite reference signal from a first network device. The composite reference signal is a time domain concatenation of at least a first reference signal and a last reference signal. The composite reference signal has a single cyclic prefix. The cyclic prefix is determined according to a last part of the single OFDM symbol.

According to an eighth aspect there is presented a network device for receiving reference signals. The network device comprises processing circuitry. The network device comprises a computer program product storing instructions that, when executed by the processing circuitry, causes the network device to receive, in a single OFDM symbol, a composite reference signal from a first network device. The composite reference signal is a time domain concatenation of at least a first reference signal and a last reference signal. The composite reference signal has a single cyclic prefix. The cyclic prefix is determined according to a last part of the single OFDM symbol.

According to a ninth aspect there is presented a network device for receiving reference signals. The network device comprises a receive module configured to receive, in a single OFDM symbol, a composite reference signal from a first network device. The composite reference signal is a time domain concatenation of at least a first reference signal and a last reference signal. The composite reference signal has a single cyclic prefix. The cyclic prefix is determined according to a last part of the single OFDM symbol.

According to a tenth aspect there is presented a computer program for receiving reference, the computer program comprising computer program code which, when run on processing circuitry of a network device, causes the processing circuitry to perform a method according to the sixth aspect.

According to an eleventh aspect there is presented a computer program product comprising a computer program according to at least one of the fifth aspect and the tenth aspect and a computer readable storage medium on which the computer program is stored. The computer readable storage medium can be a non-volatile computer readable storage medium.

Advantageously these methods, these network devices, these computer programs, and this computer program product provides efficient transmission and reception of reference signals.

Advantageously, with analog beamforming, several reference signals can be jointly beamformed within the same OFDM symbol. With two reference signals, such as time synchronization signals (TSS) and mobility reference m signals (MRS), twice as many transmission beams can be scanned in each time interval as compared to having separate symbols for TSS and MRS. Other notations of any of these signals are Beam Reference Signals (BRS).

Advantageously, channel estimate from the first reference signal can be used in a coherent detection the second reference signal, when these two reference signals span the same frequency interval.

Advantageously, by using few OFDM symbols, such as only a single OFDM symbol, the time required for synchronization and beam finding can be reduced.

Advantageously, the single carrier properties are conserved.

Advantageously these methods, these network devices, these computer programs, and this computer program enable use of a time domain matched filter for the first reference signal (e.g. TSS) to find time synchronization.

Advantageously, the reference signal can be designed with good (low) cross correlation properties. A low cross correlation is not guaranteed between the reference signals and a control channel which is channel coded and OFDM modulated.

It is to be noted that any feature of the first, second, third, fourth, fifth, sixth seventh, eighth, ninth, tenth and eleventh aspects may be applied to any other aspect, wherever appropriate. Likewise, any advantage of the first aspect may equally apply to the second, third, fourth, fifth, sixth seventh, eighth, ninth, tenth, and/or eleventh, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1A:
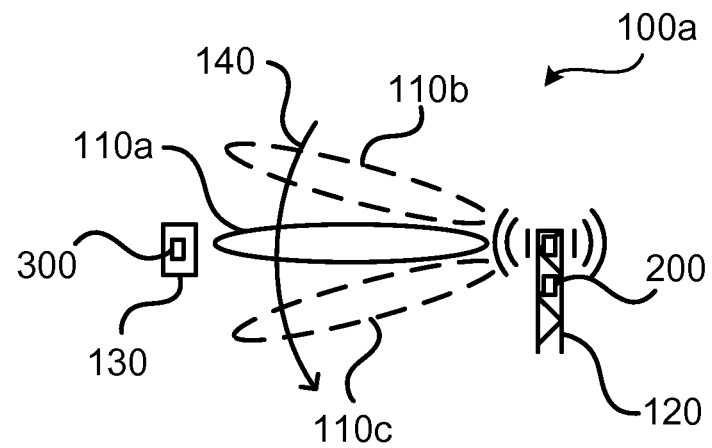
FIGS. 1a and 1b are schematic diagrams illustrating a communication network according to embodiments.

FIG. 1a is a schematic diagram illustrating a communications network 100a where embodiments presented herein can be applied. The communications network 100a comprises a radio access network node 120. The radio access network node 120 in comprises a first network device 200. The radio access network node 120 is configured to provide network access to a wireless device 130. The radio access network node 120 can be any of a radio base station, a base transceiver station, a node B, an evolved node B, or a an access point.

The wireless device 130 comprises a second network device 300. The wireless device 130 can be any of a portable wireless device, a mobile station, a mobile phone, a handset, a wireless local loop phone, a user equipment (UE), a smartphone, a laptop a computer, a tablet computer, a wireless modem, or a sensor device.

Details for the first network device 200 and the second network device 300 will be disclosed below.

Figure 1B:
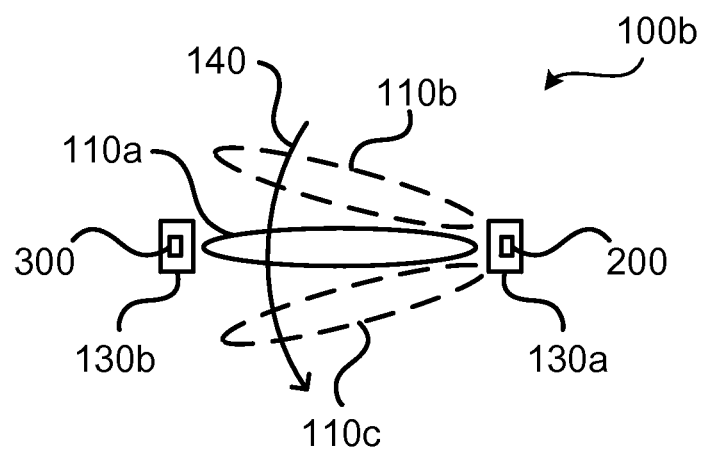

FIG. 1b is a schematic diagram illustrating a communications network 100b where embodiments presented herein can be applied. The communications network mob comprises a first wireless device 130a and a second wireless device 130b. The communications network mob represents a so-called device-to-device communications system.

The first wireless device 130a comprises a first network device 200. The second wireless device 130b comprises a second network device 300. Each of the first wireless device 130a and the second wireless device 130b can be any of a portable wireless device, a mobile station, a mobile phone, a handset, a wireless local loop phone, a user equipment (UE), a smartphone, a laptop a computer, a tablet computer, a wireless modem, or a sensor device.

The main principles of beamforming have been disclosed above. In more detail beamforming can be used to improve coverage of reference signals, such as synchronization signals and cell search signals, to improve the signal to noise and interference ratio. The benefits of beamforming could even increase for communications networks operating at high frequencies, e.g. above 15 GHz, where propagation is more challenging.

In terms of beamforming being used for initial access procedures, the radio access network node 120 can, in a directional cell search procedure, periodically transmit reference signals, such as synchronization signals and cell search signals, in transmission beams to scan the angular space. Beamforming can thereby be used in order to increase the transmitted signal strength in selected spatial directions (as defined by the directions of the transmission beams).

In general terms, reference signals can be used by the second network device 300 for achieving synchronization with a given transmission beam 110a, 110b, 110c, the first network device 200, or a carrier. The reference signals can further be used for estimating the communications channel of a given transmission beam 110a, 110b, 110c, detecting a given transmission beam identity, measuring the signal strength of a given transmission beam 110a, 110b, 110c, during transmission beam selection, etc.

The radio access network node 120 is therefore, in the embodiment of FIG. 1a where the first network device 200 is part of the radio access network node 120 and where the second network device 300 is part of the wireless device 130, configured to transmit signals, such as reference signals, in transmission beams 110a, 110b, 110c. It is assumed that the wireless device 130 is enabled to receive transmission from the radio access network node 120 in at least one of these transmission beams 110a, 110b, 110c. The radio access network node 120 is configured to transmit the signals in one transmission beam 110a, 110b, 110c at the time, and thus sweep through the transmission beams, as indicated by reference numeral 140 in FIGS. 1a and 1b. There are different ways for the radio access network node 120 to sweep through the transmission beams. However, exactly how the radio access network node 120 sweeps through the transmission beams is out of the scope of the present disclosure. Likewise, in the embodiment of FIG. 1b where the first network device 200 is part of the first wireless device 130a and where the second network device 300 is part of the second wireless device 130b, the first wireless device 130a is configured to transmit signals, such as reference signals, in transmission beams 110a, 110b, 110c. It is assumed that the second wireless device 130b is enabled to receive transmission from the first wireless device 130a in at least one of these transmission beams 110a, 110b, 110c. The first wireless device 130a is configured to transmit the signals in one transmission beam 110a, 110b, 110c at the time, and thus sweep through the transmission beams, as indicated by reference numeral 140. There are different ways for the first wireless device 130a to sweep through the transmission beams. However, exactly how the first wireless device 130a sweeps through the transmission beams is out of the scope of the present disclosure.

When beamforming is performed in the frequency domain, one specific beamformer can be applied to those subcarriers which are used for a specific signal or channel. For analog (and time-domain) beamforming, the beamforming scaling and phase shifts are applied after the inverse frequency transformation of the signal to be transmitted. Time-domain signals from many antennas are thus combined in the beamforming. In this way, the beamforming is the same for all subcarriers from a single signal generator. This time domain beamforming can be performed on an analog signal (i.e., after digital to analog conversion of the signal to be transmitted), or on a digital signal (i.e., before the digital-to-analog converter) but after the inverse frequency transformation. An alternative to frequency domain beamforming and analog beamforming that represents a compromise between flexibility and hardware costs is hybrid beamforming, which basically reduces the amount of digital-to-analog converter and inverse transformers but at the same time can achieve some flexibility.

Each transmission beam 110a, 110b, 110c can correspond to a directional beam. However, the herein disclosed embodiments are not limited to any particular widths of the transmission beams 110a, 110b, 110c and hence the transmission beams 110a, 110b, 110c could be either narrow (e.g., device specific) or wide (e.g., cell specific).

Figure 9:
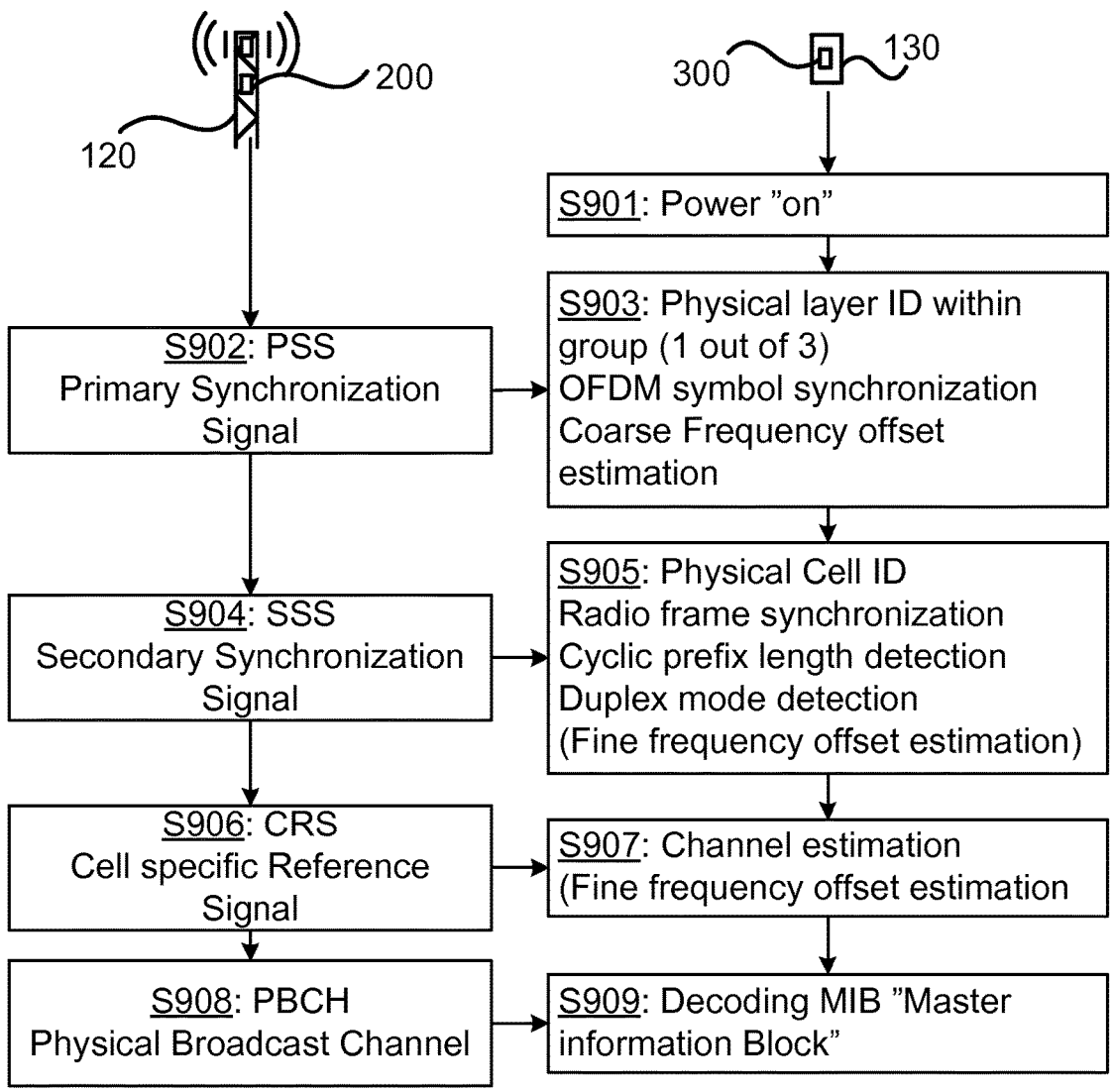
FIG. 9 is a signalling diagram according to prior art.
Figure 10:
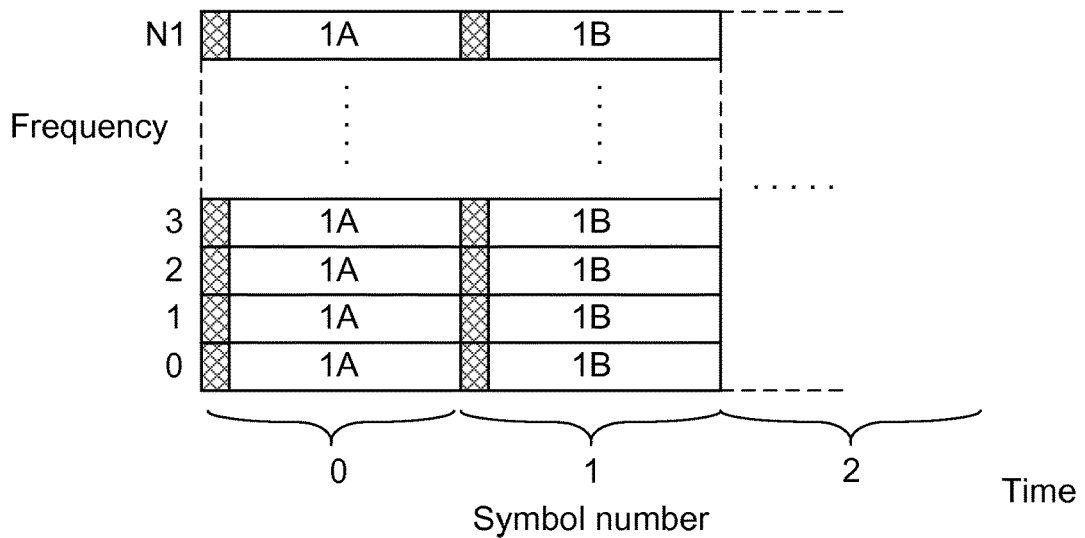
FIGS. 10 and 11 are schematic illustrations of reference signal allocation according to prior art.
Figure 11:
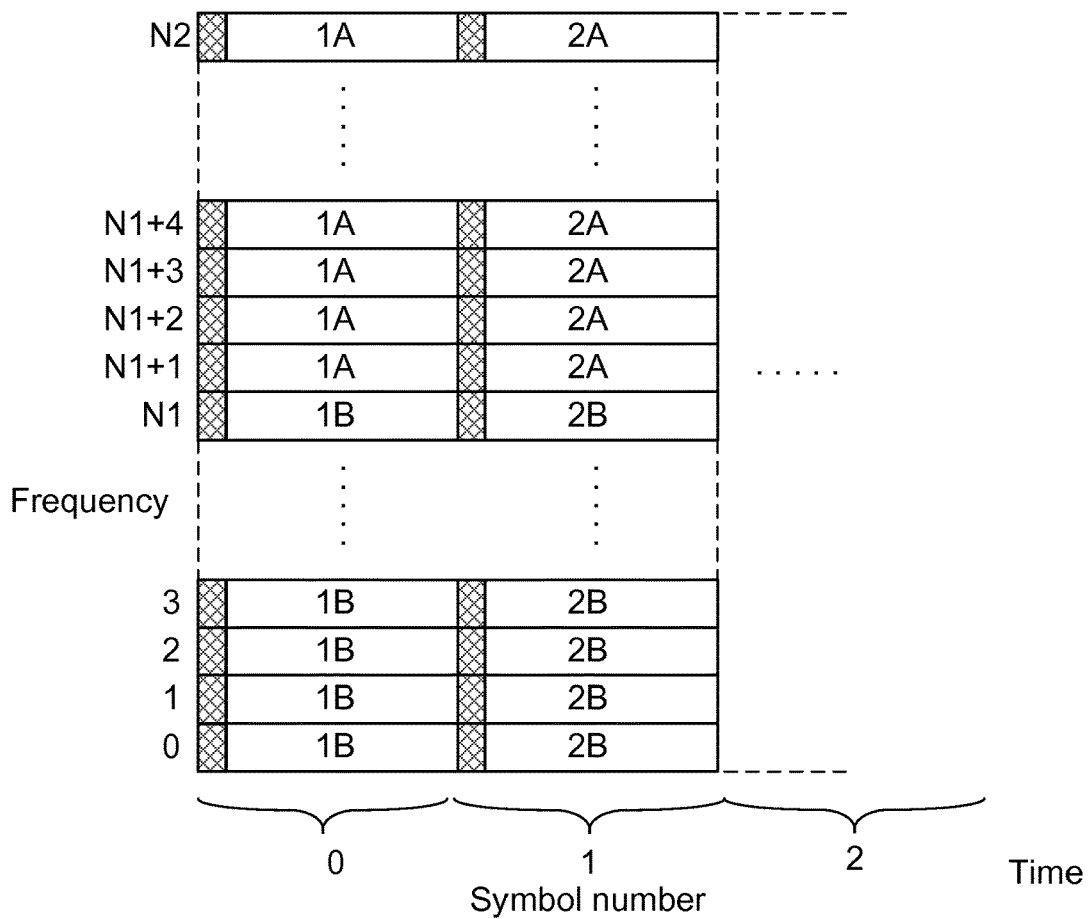

A procedure for transmitting and receiving reference signals in the form of PSS and SSS has been disclosed above with reference to FIG. 9. Two examples of how such reference signals can be transmitted have also been disclosed above with reference to FIGS. 10 and 11. Some disadvantages of these examples of how such reference signals can be transmitted have also been noted above. Hence, there is still a need for an improved transmission and reception of reference signals.

The embodiments disclosed herein thus relate to mechanisms for transmitting and receiving reference signals. In order to obtain such mechanisms there is provided a network device denoted a first network device, a method performed by the first network device, a computer program product comprising code, for example in the form of a computer program, that when run on processing circuitry of the first network device, causes the first network device to perform the method. In order to obtain such mechanisms there is further provided a network device denoted a second network device, a method performed by the second network device, and a computer program product comprising code, for example in the form of a computer program, that when run on processing circuitry of the second network device, causes the second network device to perform the method.

Figure 2A:
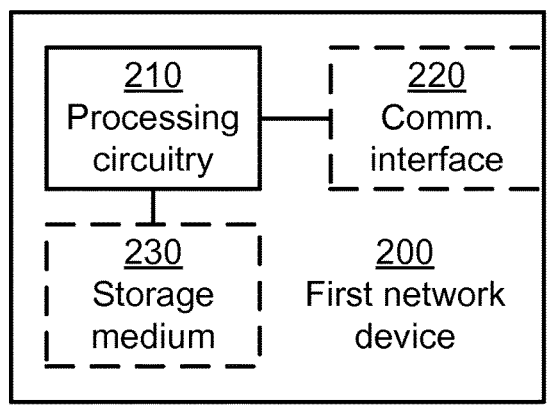
FIG. 2a is a schematic diagram showing functional units of a first network device according to an embodiment.

FIG. 2a schematically illustrates, in terms of a number of functional units, the components of a first network device 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 410a (as in FIG. 4), e.g. in the form of a storage medium 230. The processing circuitry 210 may further be provided as at least one application specific integrated circuit (ASIC), or field programmable gate array (FPGA).

Particularly, the processing circuitry 210 is configured to cause the first network device 200 to perform a set of operations, or steps, S102-S104. These operations, or steps, S102-S104 will be disclosed below. For example, the storage medium 230 may store the set of operations, and the processing circuitry 210 may be configured to retrieve the set of operations from the storage medium 230 to cause the first network device 200 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The first network device 200 may further comprise a communications interface 220 for communications with a second network device 300. As such the communications interface 220 may comprise one or more transmitters and receivers, comprising analogue and digital components and a suitable number of antennas for wireless communications and ports for wireline communications.

The processing circuitry 210 controls the general operation of the first network device 200 e.g. by sending data and control signals to the communications interface 220 and the storage medium 230, by receiving data and reports from the communications interface 220, and by retrieving data and instructions from the storage medium 230. Other components, as well as the related functionality, of the first network device 200 are omitted in order not to obscure the concepts presented herein.

Figure 2B:
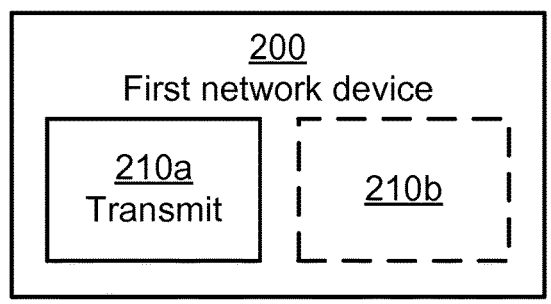
FIG. 2b is a schematic diagram showing functional modules of a first network device according to an embodiment.

FIG. 2b schematically illustrates, in terms of a number of functional modules, the components of a first network device 200 according to an embodiment. The first network device 200 of FIG. 2b comprises a transmit module 210a configured to perform below steps S102, S102a, S104. The first network device 200 of FIG. 2b may further comprise a number of optional functional modules, as represented by functional module 210b. The functionality of functional module 210a will be further disclosed below in the context of which the functional module 210a may be used. In general terms, each functional module 210a-210b may be implemented in hardware or in software. Preferably, one or more or all functional modules 210a-210b may be implemented by the processing circuitry 210, possibly in cooperation with functional units 220 and/or 230. The processing circuitry 210 may thus be arranged to from the storage medium 230 fetch instructions as provided by a functional module 210a-210b and to execute these instructions, thereby performing any steps as will be disclosed hereinafter.

As disclosed above, the first network device 200 can be implemented in a radio access network node 120 and/or in a wireless device (denoted a first wireless device 130a).

Figure 3A:
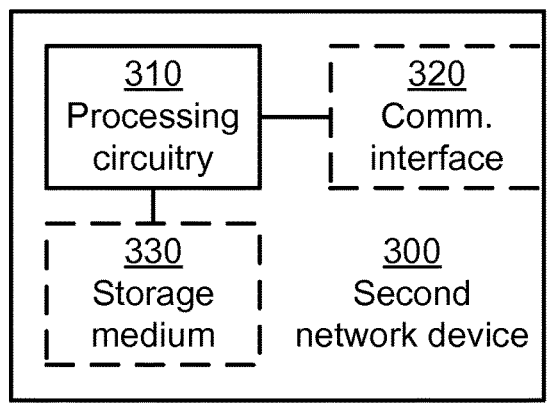
FIG. 3a is a schematic diagram showing functional units of a second network device according to an embodiment.

FIG. 3a schematically illustrates, in terms of a number of functional units, the components of a second network device 300 according to an embodiment. Processing circuitry 310 is provided using any combination of one or more of a suitable central processing unit (CPU), multiprocessor, microcontroller, digital signal processor (DSP), etc., capable of executing software instructions stored in a computer program product 410b (as in FIG. 4), e.g. in the form of a storage medium 330. The processing circuitry 310 may further be provided as at least one application specific integrated circuit (ASIC), or field programmable gate array (FPGA).

Particularly, the processing circuitry 310 is configured to cause the second network device 300 to perform a set of operations, or steps, S202-S204. These operations, or steps, S202-S204 will be disclosed below. For example, the storage medium 330 may store the set of operations, and the processing circuitry 310 may be configured to retrieve the set of operations from the storage medium 330 to cause the second network device 300 to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The second network device 300 may further comprise a communications interface 320 for communications with a first network device 200. As such the communications interface 320 may comprise one or more transmitters and receivers, comprising analogue and digital components and a suitable number of antennas for wireless communications and ports for wireline communications.

The processing circuitry 310 controls the general operation of the second network device 300 e.g. by sending data and control signals to the communications interface 320 and the storage medium 330, by receiving data and reports from the communications interface 320, and by retrieving data and instructions from the storage medium 330. Other components, as well as the related functionality, of the second network device 300 are omitted in order not to obscure the concepts presented herein.

Figure 3B:
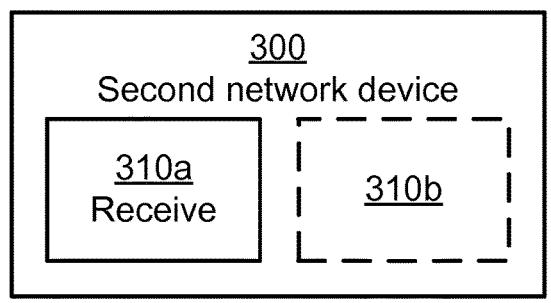
FIG. 3b is a schematic diagram showing functional modules of a second network device 2 name according to an embodiment.

FIG. 3b schematically illustrates, in terms of a number of functional modules, the components of a second network device 300 according to an embodiment. The second network device 300 of FIG. 3b comprises a receive module 310a configured to perform below steps S202, S202a, S204. The second network device 300 of FIG. 3b may further comprise a number of optional functional modules, as represented by functional module 310b. The functionality of functional module 310a will be further disclosed below in the context of which the functional module 310a may be used. In general terms, each functional module 310a-310b may be implemented in hardware or in software. Preferably, one or more or all functional modules 310a-310b may be implemented by the processing circuitry 310, possibly in cooperation with functional units 320 and/or 330. The processing circuitry 310 may thus be arranged to from the storage medium 330 fetch instructions as provided by a functional module 310a-310b and to execute these instructions, thereby performing any steps as will be disclosed hereinafter.

As disclosed above, the second network device 300 can be implemented in a wireless device 130 (denoted a second wireless device 130b in the scenario of FIG. 1b).

Figure 4:
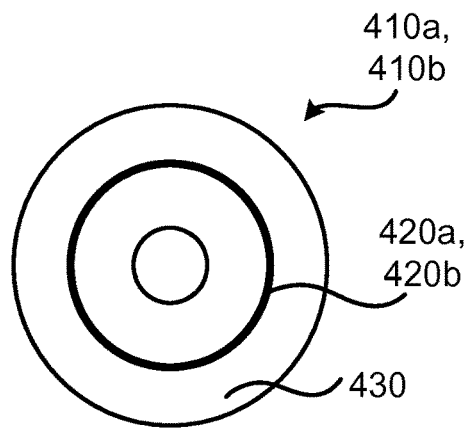
FIG. 4 shows one example of a computer program product comprising computer readable means according to an embodiment.

FIG. 4 shows one example of a computer program product 410a, 410b comprising computer readable means 430. On this computer readable means 430, a computer program 420a can be stored, which computer program 420a can cause the processing circuitry 210 and thereto operatively coupled entities and devices, such as the communications interface 220 and the storage medium 230, to execute methods according to embodiments described herein. The computer program 420a and/or computer program product 410a may thus provide means for performing any steps of the first network device 200 as herein disclosed. On this computer readable means 430, a computer program 420b can be stored, which computer program 420b can cause the processing circuitry 310 and thereto operatively coupled entities and devices, such as the communications interface 320 and the storage medium 330, to execute methods according to embodiments described herein. The computer program 420b and/or computer program product 410b may thus provide means for performing any steps of the second network device 300 as herein disclosed.

In the example of FIG. 4, the computer program product 410a, 410b is illustrated as an optical disc, such as a CD (compact disc) or a DVD (digital versatile disc) or a Blu-Ray disc. The computer program product 410a, 410b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Mash memory. Thus, while the computer program 420a, 420b is here schematically shown as a track on the depicted optical disk, the computer program 420a, 420b can be stored in any way which is suitable for the computer program product 410a, 410b.

Figure 5:
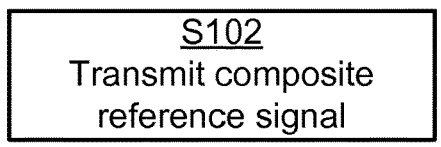
FIGS. 5, 6, 7, and 8 are flowcharts of methods according to embodiments.
Figure 6:
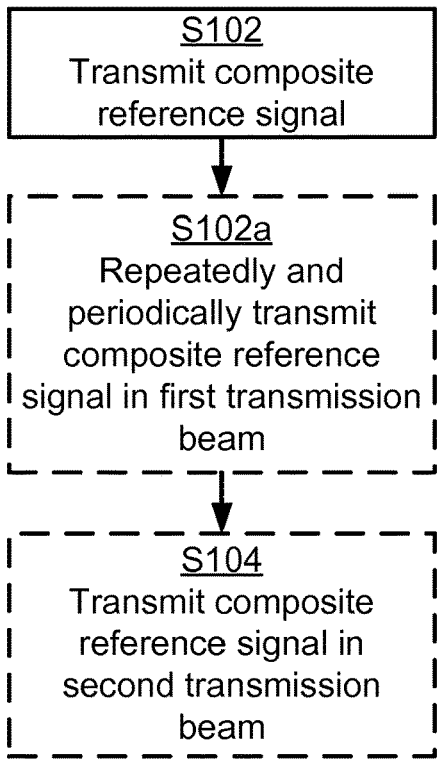
Figure 7:
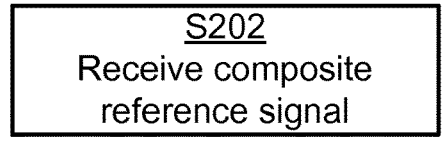
Figure 8:
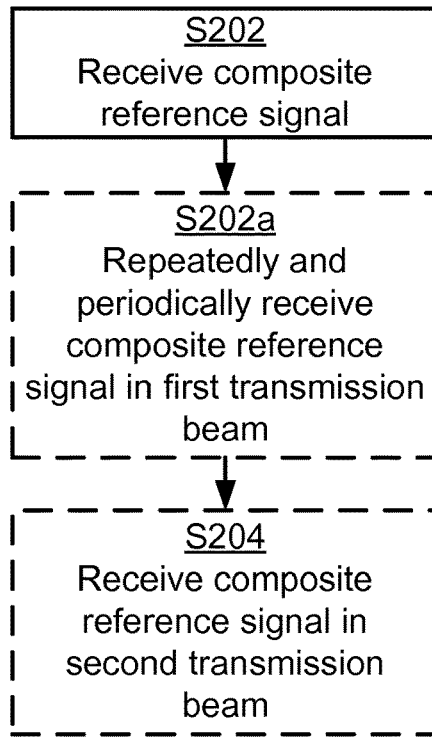

FIGS. 5 and 6 are flow charts illustrating embodiments of methods for transmitting reference signals as performed by the first network device 200. FIGS. 7 and 8 are flow charts illustrating embodiments of methods for receiving reference signals as performed by the second network device 300. The methods are advantageously provided as computer programs 420a, 420b.

Figure 12:
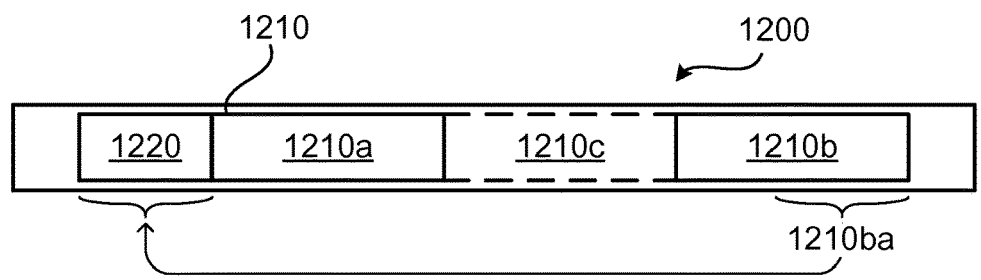
FIG. 12 is a schematic illustration of an OFDM symbol according to embodiments.

Reference is now made to FIG. 5 illustrating a method for transmitting reference signals as performed by the first network device 200 according to an embodiment. Parallel reference is made to FIG. 12 illustrating a single OFDM symbol 1200 according to an embodiment.

The first network device 200 is configured to, in a step S102, transmit, in a single OFDM symbol 1200, a composite reference signal 1210 to a second network device 300. In this respect the transmit module 210a may comprise instructions that when executed by the first network device 200 causes the processing circuitry 210, possibly in conjunction with the communications interface 220 and the storage medium 230, to transmit the composite reference signal 1210 in the single OFDM symbol 1200 in order for the first network device 200 to perform step S102. The composite reference signal 1210 is a time domain concatenation of at least a first reference signal 1210a and a last reference signal 1210b. The composite reference signal 1210 has a single cyclic prefix 1220. The cyclic prefix 1220 is determined according to a last part 1210ba of the single OFDM symbol 1200.

A time, frequency and beam finding reference signal may thereby be formed by concatenating in the time domain several reference signals into one OFDM symbol. This construction can be done as a discrete Fourier transform precoded OFDM symbol with a cyclic prefix.

Reference is now made to FIG. 6 illustrating methods for transmitting reference signals as performed by the first network device 200 according to further embodiments.

There can be different ways to transmit the composite reference signal 1210. For example, the second network device 300 could need multiple repetitions of the composite reference signal 1210 to detect it. The same composite reference signal 1210 can therefore be periodically repeated in a given direction. Hence, according to an embodiment the first network device 200 is configured to, in a step S102a, repeatedly and periodically transmit the composite reference signal 1210 in a first transmission beam 110a. In this respect the transmit module 210a may comprise instructions that when executed by the first network device 200 causes the processing circuitry 210, possibly in conjunction with the communications interface 220 and the storage medium 230, to repeatedly and periodically transmit the composite reference signal 1210 in the first transmission beam 110a in order for the first network device 200 to perform step insert step S102a.

There can be different ways to periodically repeat the same composite reference signal 1210 in the given direction. According to a first embodiment the composite reference signal 1210 is repeatedly and periodically transmitted in the first transmission beam 110a in N4 consecutive OFDM symbols 1200, where N4>1 is an integer. Hence, as an example, the composite reference signal 1210 can be repeatedly transmitted in at least two OFDM symbols 1200 after each other. According to a second embodiment the composite reference signal 1210 is repeatedly and periodically transmitted in the first transmission beam 110a every N5 OFDM symbol intervals, where N5>1 is an integer. Hence, as an example, the composite reference signal 1210 can be repeatedly transmitted every second OFDM symbols 1200.

There can be further different ways to transmit the composite reference signal 1210. For example, beamforming can be used to transmit the composite reference signal 1210 in more than one direction, as in FIGS. 1a and 1b. Hence, assume that the composite reference signal 1210 is transmitted in a first transmission beam 110a at a first time instant. According to an embodiment the first network device 200 is then configured to, in a step S104, transmit at least one further instance of the composite reference signal, 1210. Each at least one further instance of the composite reference signal 1210 is transmitted in a respective transmission beam 110b, 110c at a respective second time instant. Each transmission beam 110a, 110b, 110c is transmitted in a unique direction. In this respect the transmit module 210a may comprise instructions that when executed by the first network device 200 causes the processing circuitry 210, possibly in conjunction with the communications interface 220 and the storage medium 230, to transmit the at least one further composite reference signal in order for the first network device 200 to perform step S104.

One instance of the composite reference signal 1210 can be transmitted on a plurality of sub-carriers f0, f1, . . . , f23, where each sub-carrier has its own carrier frequency. The composite reference signal 1210 can thus be allocating several sub-carriers, see FIG. 13.

One embodiment of how a composite reference signal 1210 can be formed from a first reference signal 1210a and a second reference signal (as represented by the herein disclosed last reference signal 1210b) will now be disclosed. As the skilled person understands, this embodiment can be generalized to a composite reference signal comprising any number of reference signals.

Denote a column vector $d_{1u}$ with a first synchronization signal 1210a as $$d_{1u}=[d_{1u}(0)d_{1u}(1) \ldots d_{1u}(N_{1d}-1)]^T \quad (1)$$

where the $N_{1d}$ is the symbol length of the first synchronization signal. This first synchronization signal can for example be a Zadoff-Chu sequence. Thus:

$$d_{1u}(n) = e^{-j\frac{\pi n(n+1)}{N_{ZC}}} \quad 0 \le n \le N_{ZC}-1 \quad (2)$$

with $N_{ZC}=N_{1d}$ such as used for PSS in LTE Release 8, see 3GPP TS 36.211 section 6.11.1.1.

Also, denote a column vector $d_{2u}$ with a second synchronization signal 1210b as $$d_{2u}=[d_{2u}(0)d_{2u}(1) \ldots d_{2u}(N_{2d}-1)]^T \quad (3)$$

where the $N_{2d}$ is the length of the a second synchronization signal.

These two synchronization signals 1210b, 1210b are then concatenated into one column vector $d_u$ as follows:

$$d_u=[d_u(0)d_u(1) \ldots d_u(N_d-1)]^T=[d_{1u}^T d_{2u}^T]^T \quad (4)$$

This column vector $d_u$ thus represents the composite reference signal 1210 and is precoded by a discrete Fourier transform (DFT):

$$D_u(k) = \frac{1}{\sqrt{N_d}} \sum_{n=0}^{N_d-1} d_u(n)e^{-\frac{j2\pi nk}{N_d}} \quad (5)$$

for $k=0, \ldots, N_d-1$, where $N_d$ is the length of the composite reference signal 1210, i.e., $N_d=N_{1d}+N_{2d}$, and where $D_u$ thus is the DFT transformed version of the composite reference signal 1210. An OFDM baseband signal can now be constructed from the DFT transformed version $D_u$ of the composite reference signal 1210 $d_u$ as follows:

$$s_u(n) = \frac{1}{\sqrt{N_{FFT}}} \sum_{k=0}^{N_d-1} D_u(k)e^{\frac{j2\pi n(k+K_0)}{N_{FFT}}} \quad (6)$$

for $n=0, \ldots, N_{FFT}-1$, where $K_0$ is used to denote first sub-carrier in the frequency interval for which this composite synchronization signal is allocated, and where $N_{FFT}$ represents the number of data points in the Fast Fourier Transform (FFT) used to implement the DFT operation. As noted above, the cyclic prefix 1220 is determined according to a last part 1210ba of the single OFDM symbol 1200. According to the present embodiment the cyclic prefix samples are therefore copied from the last part of the OFDM symbol and inserted into the first part of the OFDM symbol.

Figure 13:
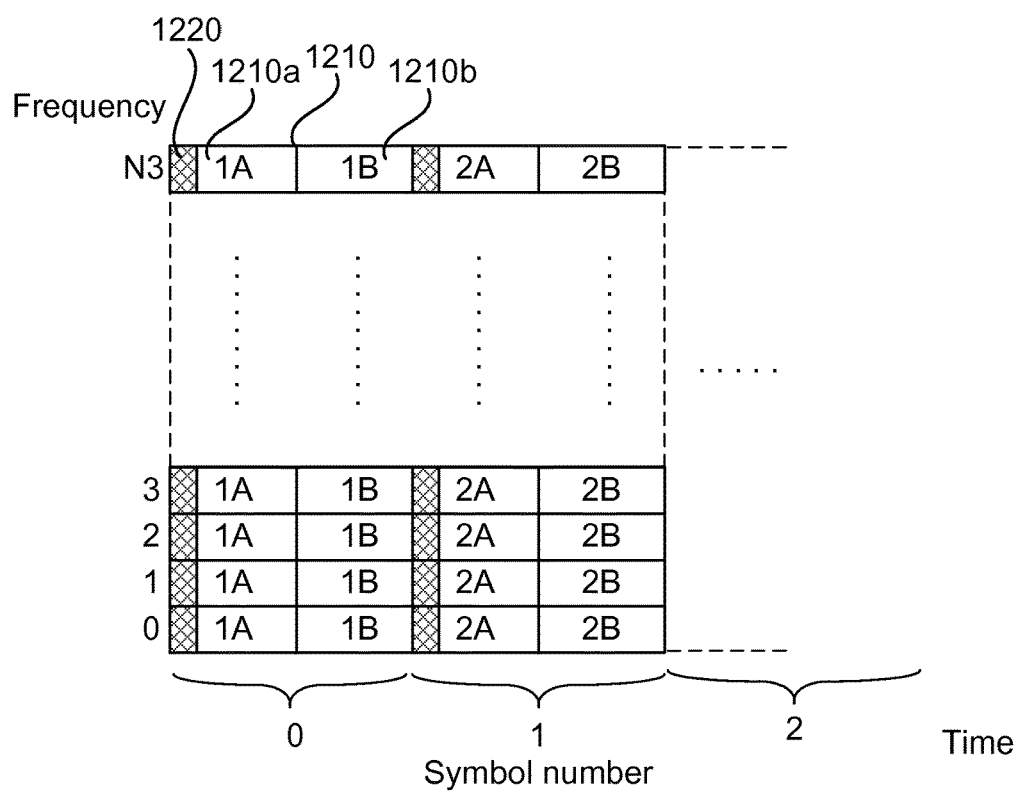
FIG. 13 is a schematic illustration of reference signal allocation according to embodiments.

FIG. 13 schematically illustrates reference signal allocation in a time frequency grid according to an embodiment. Two OFDM symbols are shown along the time axis and N3+1, where N3 is an integer, number of sub-carriers are shown along the frequency axis. As an example, N3=23 or N3=73. Each OFDM symbol comprises a composite reference signal 1210 comprising a cyclic prefix 1220, a first reference signal 1210a (here denoted by 1A) and a last reference signal 1210b (here denoted by 1B) which are processed as described above in equations (1) to (6). In FIG. 13 reference numerals have only been provided for one OFDM symbol for one subcarrier.

Reference is now made to FIG. 7 illustrating a method for receiving reference signals as performed by the second network device 300 according to an embodiment.

As disclosed above, the first network device 200 transmits, in a single OFDM symbol 1200, the composite reference signal 1210 to the second network device 300. The second network device 300 is therefore configured to, in a step S202, receive, in a single OFDM symbol 1200, the composite reference signal 1210 from the first network device 200. In this respect the receive module 310a may comprise instructions that when executed by the second network device 300 causes the processing circuitry 310, possibly in conjunction with the communications interface 320 and the storage medium 330, to receive the composite reference signal 1210 in the single OFDM symbol 1200 in order for the second network device 300 to perform step S202.

As disclosed above, the composite reference signal 1210 is a time domain concatenation of at least a first reference signal 1210a and a last reference signal 1210b. As disclosed above, the composite reference signal 1210 has a single cyclic prefix 1220. As disclosed above, the cyclic prefix 1220 is determined according to a last part 1210ba of the single OFDM symbol 1200.

Reference is now made to FIG. 8 illustrating methods for receiving reference signals as performed by the second network device 300 according to further embodiments.

As disclosed above, there can be different ways to transmit the composite reference signal 1210. The same composite reference signal 1210 can be periodically repeated in a given direction. Hence, according to an embodiment the second network device 300 is configured to, in a step S202a, repeatedly and periodically receiving the composite reference signal 1210 in a first transmission beam 110a.

As disclosed above, the composite reference signal 1210 can be repeatedly and periodically transmitted by the first network device 200 in the first transmission beam 110a in N4 consecutive OFDM symbols 1200, where N4>1 is an integer. Hence, the composite reference signal 1210 can be repeatedly and periodically received by the second network device 300 in the first transmission beam 110a in N4 consecutive OFDM symbols 1200.

As also disclosed above, the composite reference signal 1210 can be repeatedly and periodically transmitted by the first network device 200 in the first transmission beam 110a every N5 OFDM symbol intervals, where N5>1 is an integer. Hence, the composite reference signal 1210 can be repeatedly and periodically received by the second network device 300 in the first transmission beam 110a every N5 OFDM symbol intervals.

As also disclosed above, beamforming can be used to transmit the composite reference signal 1210 in more than one direction, as in FIGS. 1a and 1b. Thus, the composite reference signal 1210 can be received in a first transmission beam 110a at a first time instant. According to an embodiment the second network device 200 is further configured to, in a step S204, receive at least one further instance of the composite reference signal 1210. Each at least one further instance of the composite reference signal 1210 is received in a respective transmission beam 110b, 110c at a respective second time instant. Each transmission beam 110a, 110b, 110c is received in a unique direction. In this respect the receive module 310a may comprise instructions that when executed by the second network device 300 causes the processing circuitry 310, possibly in conjunction with the communications interface 320 and the storage medium 330, to receive the at least one further composite reference signal in order for the second network device 300 to perform step S204.

As also disclosed above, one instance of the composite reference signal 1210 can be transmitted on a plurality of sub-carriers f0, f1, . . . , f23, where each sub-carrier has its own carrier frequency. Hence, the second network device 300 can receive one instance of the composite reference signal on at least one of the plurality of sub-carriers f0, f1, . . . , f23.

Embodiments relating to the composite reference signal 1210 and the OFDM symbol 1200 comprising the composite reference signal 1210 will now be disclosed.

There may be different ways to provide the OFDM symbol 1200. For example, the OFDM symbol can be a discrete Fourier transform (DFT) precoded OFDM symbol.

At least the first reference signal 1210a can comprise a Zadoff-Chu sequence. Further, also the second reference signal 1210b can comprise a Zadoff-Chu sequence.

There may be different kinds of reference signals that can be transmitted by the first network device 200 and received by the second network device 300 in the composite reference signal 1210. Some examples relating thereto will now be disclosed. However, as the skilled person understands, other examples of reference signals than those presented herein are also equally possible.

The composite reference signal 1210 could be used to provide a hierarchical node/cell or beam identity where the usage of first reference signal 1210a and the last reference signal 1210b allows to encode more identities in a single composite reference signal 1210. As a first example, the first reference signal 1210a and the last reference signal 1210b can provide hierarchical representations of an identity of the first network device 200 or of a first transmission beam 110a used for transmission of the composite reference signal 1210. As a second example, the first reference signal 1210a and the last reference signal 1210b could provide hierarchical representations of a timing indication. The timing indication can indicate a time slot in which the second network device 300 is to transmit a random access channel preamble to the first network device 200. For example, the first reference signal 1210a can correspond to a primary synchronization signal (PSS) and the last reference signal 1210b can correspond to a secondary synchronization signal (SSS). For example, the first reference signal 1210a can be a time synchronization signal (TSS), and the last reference signal 1210b can be a mobility reference signal (MRS). Other notations of any of these signals are Beam Reference Signals (BRS).

The second network device 300 may detect the first reference signal 1210a in the single OFDM symbol 1200 prior to detecting the second reference signal 1210b in the same single OFDM symbol 1200. At least one of power and frequency offset of the received singe OFDM symbol 1200 can be estimated from the first reference signal 1210a and the second reference signal 1210b. Hence, after TSS has been detected, the second network device 300 may use the TSS and the MRS for power and/or frequency offset estimation.

Advantageously, the cyclic prefix can be constructed only by using MRS. The performance of detection of TSS is degraded when adding a cyclic prefix to TSS. Some of the good time and frequency correlation properties of a Zadoff-Chu sequence, which are typically used for TSS, are lost. With both TSS and MRS in the same OFDM symbol (where TSS is placed first), there will not be any cyclic prefix constructed from TSS. Instead the cyclic would be created from the last part of the MRS. This follows directly by using DFTS-OFDM with cyclic prefix.

It has above been disclosed how to transmit two reference signals 1210a, 1210b as a composite reference signal 1210 within one OFDM symbol 1200. The same approach can be extended in a straightforward manner to include any number of reference signals into on composite reference signal 1210 in one single OFDM symbol 1200. That is, the composite reference signal 1210 can be a time domain concatenation of the first reference signal 1210a, at least one intermediate reference signal 1210c, and the last reference signal 1210b. Each at least one intermediate reference signal 1210c can, for example, be an MRS.

One embodiment of how a composite reference signal 1210 can be received by the second network device 300 will now be disclosed. As the skilled person understands, this embodiment can be generalized to reception of a composite reference signal comprising any number of reference signals.

The second network device 300 can be configured to perform the reception and detection of the reference signals 1210a, 1210b in the time domain or in frequency domain, or with a combination of time and frequency domain processing.

Typically, a receiver of second network device 300 first detects a first reference signal 1210a in the time domain, in order to achieve a time synchronization. The receiver may be implemented in the processing circuitry 310 and/or communications interface 320 of the second network device 300. Here, a lowpass filter or a bandpass filter can be used to extract the frequency interval for the reference signal 1210a. Detection is then performed by the second network device 300 calculating a cross correlation between the received signal and known version of the first reference signal 1210a. The detector may be implemented in the processing circuitry 310 of the second network device 300. The estimated timing is achieved for the timing with the largest absolute square of the cross-correlation. Also, several candidates of reference signals might be detected in the receiver of the second network device 300. In this case, the absolute square for the corresponding detectors are compared in order to select which of the candidate reference signals is considered as received. A threshold can be used of the largest absolute squared value in order to detect if any reference signal 1210a was received at all or if only noise was received.

Also, in case of possible large frequency errors, one detector in the second network device 300 can be used for each of a number of frequency error candidates. The received signal is then first compensated for a frequency offset candidate before the cross correlations are calculated. For large frequency errors, this compensation is performed before subjecting the received signal to the lowpass (or bandpass) filter. A frequency offset estimate is achieved as corresponding to the detector with the largest absolute square of the cross correlation.

This estimated timing is used in extracting a time interval of the received signal. The time interval is used during detection of the remaining reference signals.

With a time domain approach, a cross correlation is by the second network device 300 calculated for the received, lowpass filtered signals and a second reference signal 1210. By comparing cross correlations between several candidates of this second reference signal 1210*b*, a detection of the second reference signal 1210*b* can be verified.

With an accurate timing estimate, a frequency transformation, such as a DFT or a Fast Fourier Transform, can be calculated on the time interval of the OFDM symbol where reference signals 1210*a*, 1210*b* are placed. The time interval is thus achieved from the first timing estimation. A matched filter in the frequency domain can be applied to the received signal in the frequency domain after the frequency transformation. This matched filter can be constructed from only the second reference signal 1210*b* or from both the first reference signal 1210*a* and the second reference signal 1210*b*. Several matched filtered signals can be constructed from several candidates of the second reference signal 1210*b*. By comparing the matched filtered signals, a detection of which second reference signal of the candidate reference signals that was received is achieved.

The detection of the second reference signal 1210*b* can be further improved if a channel estimate from the first reference signal 1210*a* is used in the matched filter for the second reference signal 1210*b*.

A third or more reference signal 1210C can be detected in a similar manner.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for transmitting reference signals, the method being performed by a first network device, comprising:
   transmitting, in a single orthogonal frequency-division multiplexing, OFDM, symbol, a composite reference signal to a second network device,
   wherein the composite reference signal is a time domain concatenation of at least a first reference signal and a last reference signal wherein the first reference signal and the last reference signal are different and convey different information,
   wherein the composite reference signal has a single cyclic prefix, and
   wherein the cyclic prefix is determined according to a last part of the single OFDM symbol.

2. The method according to claim 1, wherein the composite reference signal is transmitted in a first transmission beam at a first time instant, the method further comprising:
   transmitting at least one further instance of the composite reference signal, each at least one further instance of the composite reference signal being transmitted in a respective transmission beam at a respective second time instant,
   wherein each transmission beam is transmitted in a unique direction.

3. The method according to claim 1, wherein one instance of the composite reference signal is transmitted on a plurality of sub-carriers, each sub-carrier having its own carrier frequency.

4. The method according to claim 1, further comprising:
   repeatedly and periodically transmitting the composite reference signal in a first transmission beam.

5. The method according to claim 4, wherein the composite reference signal is repeatedly and periodically transmitted in the first transmission beam in N4 consecutive OFDM symbols, where N4>1 is an integer.

6. The method according to claim 4, wherein the composite reference signal is repeatedly and periodically transmitted in the first transmission beam every N5 OFDM symbol intervals, where N5>1 is an integer.

7. A method for receiving reference signals, the method being performed by a second network device, comprising:
   receiving, in a single orthogonal frequency-division multiplexing, OFDM, symbol, a composite reference signal from a first network device,
   wherein the composite reference signal is a time domain concatenation of at least a first reference signal and a last reference signal, wherein the first reference signal and the second reference signal are different and convey different information,
   wherein the composite reference signal has a single cyclic prefix, and
   wherein the cyclic prefix is determined according to a last part of the single OFDM symbol.

8. The method according to claim 7, wherein the composite reference signal is received in a first transmission beam at a first time instant, the method further comprising:
   receiving at least one further instance of the composite reference signal, each at least one further instance of the composite reference signal being received in a respective transmission beam at a respective second time instant,
   wherein each transmission beam is received in a unique direction.

9. The method according to claim 7, wherein the first reference signal in the single OFDM symbol is detected prior to the second reference signal in the same single OFDM symbol, and wherein at least one of power and frequency offset of the received singe OFDM symbol is estimated from the first reference signal and the second reference signal.

10. The method according to claim 7, wherein one instance of the composite reference signal is received on at least one of a plurality of sub-carriers, each sub-carrier having its own carrier frequency.

11. The method according to claim 7, further comprising:
   repeatedly and periodically receiving the composite reference signal in a first transmission beam.

12. The method according to claim 11, wherein the composite reference signal is repeatedly and periodically received in the first transmission beam in N4 consecutive OFDM symbols, where N4>1 is an integer.

13. The method according to claim 11, wherein the composite reference signal is repeatedly and periodically received in the first transmission beam every N5 OFDM symbol intervals, where N5>1 is an integer.

14. The method according to claim 7, wherein the composite reference signal is a time domain concatenation of the first reference signal, at least one intermediate reference signal, and the last reference signal.

15. The method according to claim 7, wherein the first reference signal is a time synchronization signal, TSS, and wherein the last reference signal is a mobility reference signal, MRS.

16. The method according to claim 7, wherein the first reference signal and the last reference signal provide hierarchical representations of an identity of the first network device or of a first transmission beam used for transmission of the composite reference signal.

17. The method according to claim 7, wherein the first reference signal and the last reference signal provide hierarchical representations of a timing indication.

18. The method according to claim 7, wherein each at least one intermediate reference signal is a mobility reference signal, MRS.

19. The method according to claim 7, wherein the OFDM symbol is a discrete Fourier transform, DFT, precoded OFDM symbol.

20. The method according to claim 7, wherein at least the first reference signal comprises a Zadoff-Chu sequence.

* * * * *